United States Patent
Nam et al.

(10) Patent No.: US 10,240,068 B2
(45) Date of Patent: Mar. 26, 2019

(54) ADHESIVE FILM AND DISPLAY MEMBER USING SAME

(71) Applicant: SAMSUNG SDI CO., LTD., Yongin-si, Gyeonggi-do (KR)

(72) Inventors: Irina Nam, Uiwang-si (KR); Young Jong Kim, Uiwang-si (KR); Hwan Sung Cheon, Uiwang-si (KR); In Cheon Han, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 55 days.

(21) Appl. No.: 15/506,648

(22) PCT Filed: Jun. 29, 2015

(86) PCT No.: PCT/KR2015/006645
§ 371 (c)(1),
(2) Date: Feb. 24, 2017

(87) PCT Pub. No.: WO2016/032108
PCT Pub. Date: Mar. 3, 2016

(65) Prior Publication Data
US 2017/0253770 A1      Sep. 7, 2017

(30) Foreign Application Priority Data

Aug. 29, 2014   (KR) .......................... 10-2014-0114586

(51) Int. Cl.
*C09J 7/00*   (2018.01)
*C09J 133/06*   (2006.01)
(Continued)

(52) U.S. Cl.
CPC . *C09J 7/00* (2013.01); *C09J 7/10* (2018.01); *C09J 133/06* (2013.01);
(Continued)

(58) Field of Classification Search
None
See application file for complete search history.

(56) References Cited

U.S. PATENT DOCUMENTS

| 5,334,686 A * | 8/1994 | Ando | C08F 220/18 |
| | | | 526/307.7 |
| 6,228,965 B1 * | 5/2001 | Muta | C09J 9/00 |
| | | | 526/328.5 |

(Continued)

FOREIGN PATENT DOCUMENTS

| JP | 08-209083 A | 8/1996 |
| JP | 5424720 B2 | 2/2014 |

(Continued)

OTHER PUBLICATIONS

International Search Report for corresponding PCT Application No. PCT/KR2015/006645, dated Dec. 23, 2015, with English Translation (7 pages).

(Continued)

*Primary Examiner* — Robert S Loewe
(74) *Attorney, Agent, or Firm* — Lewis Roca Rothgerber Christie LLP

(57) ABSTRACT

An adhesive film of the present invention comprises a (meth)acrylate-based copolymer and a cross-linking agent, and a gel fraction thereof is approximately 50-95%, and a ratio of change G' in storage modulus thereof, represented by the following formula 1, is 20% or less.

$G'=(G7-G1)/G1\times 100$   [Formula 1]

(In formula 1, G1 is a storage modulus at 25° C. when the adhesive film is matured at 23° C. and a relative humidity (RH) of 55% for one day, and G7 represents a storage modulus at 25° C. when the adhesive film is matured at 23° C. and an RH of 55% for seven days.)

19 Claims, 1 Drawing Sheet

(51) Int. Cl.
  *G02F 1/1333*   (2006.01)
  *C09J 7/10*     (2018.01)
  *G02B 5/30*     (2006.01)
  *C09J 133/14*   (2006.01)

(52) U.S. Cl.
  CPC ...... *C09J 133/068* (2013.01); *G02F 1/13338* (2013.01); *C09J 133/14* (2013.01); *C09J 2201/606* (2013.01); *C09J 2203/318* (2013.01); *C09J 2205/114* (2013.01); *C09J 2433/00* (2013.01); *G02B 5/30* (2013.01); *G02F 2202/28* (2013.01)

(56) References Cited

U.S. PATENT DOCUMENTS

| | | | | |
|---|---|---|---|---|
| 6,683,147 | B2* | 1/2004 | Wigdorski | C08F 220/18 428/413 |
| 6,844,391 | B1* | 1/2005 | Iyer | C09J 133/14 428/355 AC |
| 8,399,090 | B2* | 3/2013 | Yano | C08G 18/6229 427/163.1 |
| 8,916,485 | B2* | 12/2014 | Bartholomew | C09J 7/0217 442/151 |
| 2002/0004135 | A1* | 1/2002 | Buccellato | C09J 4/00 428/355 AC |
| 2004/0182512 | A1* | 9/2004 | Matsumoto | C09J 133/068 156/326 |
| 2009/0233093 | A1* | 9/2009 | Toyama | C09J 7/0217 428/354 |
| 2009/0270557 | A1* | 10/2009 | Tomita | C08G 18/6254 525/100 |
| 2010/0028653 | A1* | 2/2010 | Kobayashi | C09J 5/00 428/319.3 |
| 2010/0068534 | A1* | 3/2010 | Paul | C08G 18/10 428/429 |
| 2010/0190918 | A1* | 7/2010 | Van Wijkschmitz | C09J 133/14 524/549 |
| 2010/0208337 | A1* | 8/2010 | Uehara | C09B 53/02 359/359 |
| 2011/0045638 | A1* | 2/2011 | Takamatsu | H01L 21/6835 438/118 |
| 2011/0111140 | A1 | 5/2011 | Jang et al. | |
| 2011/0143076 | A1* | 6/2011 | Taya | B32B 7/12 428/65.2 |
| 2011/0234948 | A1 | 9/2011 | Yoon et al. | |
| 2011/0256393 | A1* | 10/2011 | Arai | C08G 18/4072 428/352 |
| 2012/0094119 | A1 | 4/2012 | Fujita et al. | |
| 2012/0171484 | A1* | 7/2012 | Ko | C08K 5/3412 428/355 EP |
| 2012/0329970 | A1* | 12/2012 | Kishioka | B32B 7/12 526/264 |
| 2013/0289219 | A1* | 10/2013 | Krepski | C08F 2/48 525/359.2 |
| 2014/0272200 | A1* | 9/2014 | Akizuki | G02F 1/133528 428/1.54 |
| 2014/0370281 | A1* | 12/2014 | Lewandowski | C08F 120/18 428/355 AC |
| 2016/0230052 | A1* | 8/2016 | Wu | C09J 4/06 |
| 2017/0253770 | A1* | 9/2017 | Nam | C09J 7/00 |

FOREIGN PATENT DOCUMENTS

| | | |
|---|---|---|
| KR | 10-2008-0062642 A | 7/2008 |
| KR | 10-2010-0003689 A | 1/2010 |
| KR | 10-2010-0070999 A | 6/2010 |
| KR | 10-2014-0042630 A | 4/2014 |
| KR | 10-2014-0085259 A | 7/2014 |

OTHER PUBLICATIONS

Written Opinion for corresponding PCT Application No. PCT/KR2015/006645, dated Dec. 23, 2015 (7 pages).

Korean Office Action from corresponding Korean Patent Application No. 10-2014-0114586, Korean Office Action dated Sep. 26, 2017 (4 pgs.).

English translation of Written Opinion for corresponding PCT Application No. PCT/KR2015/006645, dated Dec. 23, 2015 (12 pgs.).

* cited by examiner

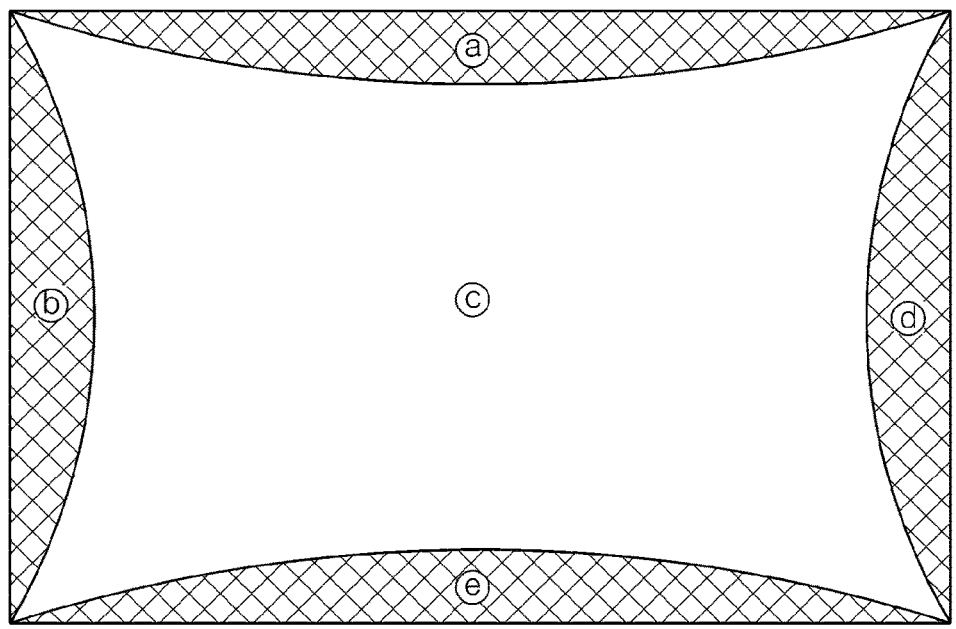

ADHESIVE FILM AND DISPLAY MEMBER USING SAME

This Application is a National Phase Patent Application and claims priority to and the benefit of International Application Number PCT/KR2015/006645, filed on Jun. 29, 2015, which claims priority to and the benefit of Korean Application No. 10-2014-0114586, filed on Aug. 29, 2014, the entire contents of both of which are incorporated herein by reference.

BACKGROUND

1. Field

The present invention relates to an adhesive film and a display member using the same.

2. Description of the Related Art

A pressure-sensitive adhesive for an optical member generally used for a liquid crystal display (LCD) is prepared from a composition including a binder, a crosslinker, a coupling agent, a solvent and additives, and is subjected to an aging process in which the adhesive is left under certain temperature and humidity conditions after a drying process for volatizing the solvent. In general, the aging process may be performed quickly under high-temperature and high-humidity conditions, for example, at about 35° C. and about 45% RH, and requires a long period of time, for example, several days, under low-temperature or low-humidity conditions. Thus, the aging process requires an aging chamber for creating certain temperature and humidity conditions or a long period of time and thus is disadvantageous in terms of cost and productivity.

A general pressure-sensitive adhesive includes an acrylic monomer, which includes an acidic component containing a carboxyl group.

In a touchscreen LCD panel using indium tin oxide (ITO), ITO is oxidized by an acid component of a pressure-sensitive adhesive and increases resistance, thereby deteriorating touchscreen characteristics.

Further, an optical film using a pressure-sensitive adhesive contracts or expands in severe environments of high temperature (for example, 85° C.) and high humidity, and peels from the LCD panel to cause defects, such as detachment or generation of bubbles, when the pressure-sensitive adhesive has insufficient durability. In addition, light leakage may occur due to a difference in dimensional change between the optical film and a pressure-sensitive adhesive layer. Thus, the pressure-sensitive adhesive is required to have high durability and physical properties for controlling or relieving stress by contraction or expansion of the optical film to suppress light leakage. In addition, the pressure-sensitive adhesive is required to have excellent re-peelability for reworking operation to remove foreign matter or processing defect when an optical film including a pressure-sensitive adhesive layer is attached to a panel.

Korean Patent Publication No. 2010-0003689 A discloses a pressure-sensitive adhesive composition which has a weight average molecular weight of 800,000 g/mol to 2,000,000 g/mol and includes an aromatic group-containing acrylic copolymer and an optically anisotropic compound having a melting point of room temperature or less to achieve low light leakage.

SUMMARY

It is one object of the present invention to provide a pressure-sensitive adhesive film having improved processability and productivity by reducing aging time of the pressure-sensitive adhesive film while relieving aging conditions for the pressure-sensitive adhesive film.

It is another object of the present invention to provide a pressure-sensitive adhesive film which realizes a pressure-sensitive adhesive layer having a relieved light leakage phenomenon and excellent heat resistance and moisture resistance.

It is a further object of the present invention to provide a pressure-sensitive adhesive film having excellent creep, peel strength, reworkability and pot life.

It is yet another object of the present invention to provide a pressure-sensitive adhesive film which includes no acidic component to prevent corrosion in a display member, thereby controlling an increase in resistance.

One aspect of the present invention provides a pressure-sensitive adhesive film including a (meth)acrylate copolymer and a crosslinker and has a storage modulus variation G' of about 20% or less, as represented by Equation 1:

$$G' = (G7 - G1)/G1 \times 100 \quad \text{[Equation 1]}$$

where G1 is the storage modulus of the pressure-sensitive adhesive film at 25° C. after aging at 23° C. and 55% RH for 1 day, and G7 is the storage modulus of the pressure-sensitive adhesive film at 25° C. after aging at 23° C. and 55% RH for 7 days.

Another aspect of the present invention provides a pressure-sensitive adhesive film including a (meth)acrylate copolymer containing an alkyl (meth)acrylate monomer, a monomer having a glass transition temperature (Tg) of about 50° C. or higher, and an oxygen-containing heterocyclic ring containing monomer.

A further aspect of the present invention provides a display member including a pressure-sensitive adhesive film.

The present invention may provide a pressure-sensitive adhesive film having improved processability and productivity by reducing aging time of the pressure-sensitive adhesive film while relieving aging conditions for the pressure-sensitive adhesive film.

The present invention may also provide a pressure-sensitive adhesive film which realizes a pressure-sensitive adhesive layer having a relieved light leakage phenomenon and excellent heat resistance and moisture resistance.

In addition, the present invention may provide a pressure-sensitive adhesive film having excellent creep, reworkability and pot life.

Further, the present invention may provide a pressure-sensitive adhesive film which includes no acidic component to prevent corrosion in a display member, thereby controlling an increase in resistance.

BRIEF DESCRIPTION OF DRAWING

FIG. 1 illustrates light leakage measuring points on a panel for evaluating light leakage.

DETAILED DESCRIPTION

In this specification, the term "(meth)acryl" refers to acryl and/or methacryl, and the term "(meth)acrylate" refers to acrylate and/or methacrylate.

As used herein, "storage modulus" is measured using a storage modulus tester at 25° C. and an oscillation frequency of 0.1 rad/s by temperature sweep testing while elevating temperature from 0° C. to 120° C. at a rate of 10° C./min.

One aspect of the present invention relates to a pressure-sensitive adhesive film including a (meth)acrylate copolymer.

In one embodiment, the adhesive film may be manufactured from a pressure-sensitive adhesive composition including a (meth)acrylate copolymer.

In the present invention, the pressure-sensitive adhesive film may be manufactured by applying the pressure-sensitive adhesive composition to a release film and may have a storage modulus variation G' of about 20% or less between storage modulus G1 at 25° C. after aging at 23° C. and 55% RH for 1 day and storage modulus G7 at 25° C. after aging at 23° C. and 55% RH for 7 days. G' may be represented by Equation 1:

$$G' = (G7 - G1)/G1 \times 100 \quad \text{[Equation 1]}$$

Within this range, the pressure-sensitive adhesive film may achieve practical adhesion performance within 24 hours at room temperature, not under high-temperature conditions required for a conventional aging process, thereby considerably improving productivity. In addition, no separate aging chamber is needed, thereby providing cost efficiency. Specifically, the pressure-sensitive adhesive film may have a storage modulus variation of about 0.5% to about 10%. For example, the pressure-sensitive adhesive film may have a storage modulus variation of about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10%.

In one embodiment, G1, that is, the storage modulus of the pressure-sensitive adhesive film at 25° C. after aging at 23° C. and 55% RH for 1 day, and G7, that is, the storage modulus of the pressure-sensitive adhesive film at 25° C. after aging at 23° C. and 55% RH for 7 days, may be about $10^5$ Pa to about $10^6$ Pa. Within this range, sticking-out of the pressure-sensitive adhesive film in cutting may be prevented and the pressure-sensitive adhesive film may exhibit excellent moisture resistance.

In one embodiment, the pressure-sensitive adhesive film may have a gel fraction difference of about 10% or less by Equation 2:

$$\text{Gel fraction difference} = GF7 - GF1 \quad \text{[Equation 2]}$$

where GF7 is the gel fraction after aging for 7 days by Equation 3 and GF1 is the gel fraction after aging for 1 day by Equation 3:

$$\text{Gel fraction (\%)} = (WC - WA)/(WB - WA) \times 100 \quad \text{[Equation 3]}$$

where WA is the weight of a wire mesh; WB is the total weight of 0.5 g of a specimen covered with the wire mesh, in which the specimen is obtained by aging a pressure-sensitive adhesive film at 23° C. and 55% RH for 1 day or 7 days; and WC is the total weight of the pressure-sensitive adhesive film and the wire mesh obtained by placing a specimen, which is obtained by aging the pressure-sensitive adhesive film and covered with the wire mesh, in a sample bottle and adding 50 cc of ethyl acetate into the sample bottle, followed by storage at 25° C. for 1 day and drying at 100° C. for 12 hours.

In one embodiment, the pressure-sensitive adhesive film may have a gel fraction of about 50% to about 95%. To calculate the gel fraction according to Equation 3, the pressure-sensitive adhesive film is prepared by applying a pressure-sensitive adhesive composition to a release film, followed by drying at 85° C. for 4 minutes and aging at 23° C. and 55% RH for 1 day or for more than 1 day. Then, the aged pressure-sensitive adhesive film is covered with a wire mesh, the weight WA of which is measured in advance, so as not to allow leakage of the composition, and the weight WB of the pressure-sensitive adhesive film and the wire mesh is measured. Then, the pressure-sensitive adhesive film covered with the wire mesh is left in 50 cc of ethyl acetate at 25° C. for 1 day and dried at 100° C. for 12 hours, followed by measuring the weight WC of the wire mesh containing the sample.

The gel fraction of the pressure-sensitive adhesive film dried as described above after aging for 1 day is within the aforementioned range, and the gel fraction after aging for more than 1 day is also within the aforementioned range. Thus, within this range, the pressure-sensitive adhesive film may achieve practical adhesion performance within 24 hours at room temperature, not under high-temperature conditions required for a conventional aging process, thereby considerably improving productivity. In addition, no separate aging chamber is needed, thereby providing cost efficiency.

In addition, when the gel fraction difference (GF7−GF1), by Equation 2, between the gel fraction (GF1) of the pressure-sensitive adhesive film after aging at 23° C. and 55% RH for 1 day and the gel fraction GF7 after aging at 23° C. and 55% RH for 7 days is about 10% or less, in which the pressure-sensitive adhesive film is prepared by applying a pressure-sensitive adhesive composition to a release film, followed by drying at 85° C. for 4 minutes, the pressure-sensitive adhesive film may achieve practical adhesion performance within only 1 day, thereby considerably improving productivity. In addition, no separate aging chamber is needed, thereby providing cost efficiency.

In one embodiment, the pressure-sensitive adhesive film may have an acid value of about 0. Thus, the pressure-sensitive adhesive film may prevent corrosion of indium tin oxide (ITO) in a display member and may also control increase in resistance due to ITO corrosion.

In one embodiment, the pressure-sensitive adhesive composition forming the pressure-sensitive adhesive film may be a thermosetting composition. Thus, the composition may be free from a photoinitiator unlike a photocurable composition.

The (meth)acrylate copolymer may have a weight average molecular weight of about 100,000 g/mol to about 1,500,000 g/mol. Within this range, the pressure-sensitive adhesive film may suppress light leakage and exhibit excellent heat resistance and moisture resistance. For example, the weight average molecular weight may range from about 200,000 g/mol to about 1,000,000 g/mol. Specifically, the pressure-sensitive adhesive film may have a weight average molecular weight of about 200,000 g/mol to about 800,000 g/mol.

The (meth)acrylate copolymer may have a polydispersity index (PDI) of about 2.5 to about 6.0, as defined by weight average molecular weight/number average molecular weight (Mw/Mn). Within this range, the pressure-sensitive adhesive film may exhibit uniform adhesive strength and suppress light leakage. Specifically, the pressure-sensitive adhesive film may have a polydispersity index of about 2.5, 3.0, 3.5, 4.0, 4.5, 5.0, 5.5, or 6.0.

The (meth)acrylate copolymer may have a glass transition temperature (Tg) of about −45° C. to about −10° C. Within this range, the pressure-sensitive adhesive film may have excellent heat resistance and moisture resistance. For example, the pressure-sensitive adhesive film may have a glass transition temperature of about −40° C. to about −25° C.

The (meth)acrylate copolymer may have a structure which contains no carboxyl group in a main-chain thereof. Accordingly, it is possible to reduce the acid value of the pressure-sensitive adhesive film and to prevent oxidation of a display member including the pressure-sensitive adhesive film so as to control increase in resistance, thereby exhibiting satisfactory display characteristics.

The (meth)acrylate copolymer may be a copolymer of a monomer mixture including an alkyl (meth)acrylate monomer, a monomer having a glass transition temperature (Tg) of about 50° C. or higher, and an oxygen-containing heterocyclic ring containing monomer.

In another embodiment, the pressure-sensitive adhesive composition may include a (meth)acrylate copolymer and a crosslinker.

In a further embodiment, the pressure-sensitive adhesive composition may include a (meth)acrylate copolymer, a crosslinker, and a silane coupling agent.

Monomer

The alkyl (meth)acrylate monomer may include a (meth)acrylate ester having a $C_1$ to $C_{20}$ linear or branched alkyl group. For example, the alkyl (meth)acrylate monomer may include at least one of methyl (meth)acrylate, ethyl (meth)acrylate, n-propyl (meth)acrylate, iso-propyl (meth)acrylate, n-butyl (meth)acrylate, t-butyl (meth)acrylate, iso-butyl (meth)acrylate, pentyl (meth)acrylate, hexyl (meth)acrylate, 2-ethylhexyl (meth)acrylate, heptyl (meth)acrylate, octyl (meth)acrylate, iso-octyl (meth)acrylate, nonyl (meth)acrylate, decyl (meth)acrylate, and lauryl (meth)acrylate, without being limited thereto.

Specifically, the alkyl (meth)acrylate monomer may include a (meth)acrylate ester having a $C_2$ to $C_8$ alkyl group. For example, the (meth)acrylate ester may include at least one of ethyl (meth)acrylate, propyl (meth)acrylate, butyl (meth)acrylate, octyl (meth)acrylate, and ethylhexyl (meth)acrylate.

The alkyl (meth)acrylate monomer may be present in an amount of about 60% to about 94.9% by weight (wt %) based on the total weight of the monomer mixture. Within this range, the pressure-sensitive adhesive film may have high adhesive strength, suppress light leakage, and exhibit excellent heat resistance and moisture resistance. For example, the alkyl (meth)acrylate monomer may be present in an amount of about 72 wt % to about 89 wt %. Specifically, the alkyl (meth)acrylate monomer may be present in an amount of about 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, or 94.9 wt %.

The monomer having a glass transition temperature (Tg) of about 50° C. or higher may include acrylate, methacrylate or vinyl monomers having a high glass transition temperature (Tg). When the monomer having a glass transition temperature (Tg) of about 50° C. or higher is used, the pressure-sensitive adhesive film may have improved adhesive strength and high peel strength. For instance, the monomer having a glass transition temperature (Tg) of about 50° C. or higher may have a glass transition temperature (Tg) of about 50° C. or higher, specifically about 80° C. to about 200° C.

Specifically, the monomer having a glass transition temperature (Tg) of about 50° C. or higher may include at least one of N-vinylpyrrolidone, acrylamide, N-alkyl substituted acrylamide, acryloylmorpholine, isobornyl acrylate, and cyclohexyl methacrylate.

The monomer having a glass transition temperature (Tg) of about 50° C. or higher may be present in an amount of about 5 wt % to about 30 wt % based on the total weight of the monomer mixture. Within this range, the pressure-sensitive adhesive film may have high adhesive strength, excellent peel strength and excellent heat resistance and moisture resistance. For example, the monomer having a glass transition temperature (Tg) of about 50° C. or higher may be present in an amount of about 10 wt % to about 20 wt %. Specifically, the monomer having a glass transition temperature (Tg) of about 50° C. or higher may be present in an amount of about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %.

The oxygen-containing heterocyclic ring containing monomer may be a (meth)acrylate monomer containing an oxygen-containing heterocyclic ring. Use of the oxygen-containing heterocyclic ring containing monomer may lead to reduction in aging time of the pressure-sensitive adhesive film at room temperature and decrease in acid value of the pressure-sensitive adhesive film. The ring of the oxygen-containing heterocyclic ring containing monomer may be opened in the presence of a Lewis base or Lewis acid to allow crosslinking to be carried out at room temperature. Thus, as in a conventional acrylic pressure-sensitive adhesive composition, the (meth)acrylate copolymer contains no carboxyl group in the main chain thereof to prevent oxidation by an acid, thereby suppressing increase in resistance in a display member including the pressure-sensitive adhesive film, particularly maintaining satisfactory characteristics of a touchscreen including ITO. In addition, the aging time may be reduced, whereby the pressure-sensitive adhesive film may achieve practical adhesion performance even by a short period of aging time within 24 hours, thereby improving cost efficiency and processability. Further, the pressure-sensitive adhesive film has excellent workability due to a long pot life.

The oxygen-containing heterocyclic ring containing monomer may include a three-membered ring, a four-membered ring, and a five-membered ring. For example, the oxygen-containing heterocyclic ring containing monomer may be a (meth)acrylate monomer including an epoxy group, an oxetane group, and a tetrahydrofurfuryl group. Specifically, the oxygen-containing heterocyclic ring containing monomer may include at least one of glycidyl methacrylate, oxetane methacrylate, and tetrahydrofurfuryl acrylate. In one embodiment, the aging time and pot life may be adjusted by adjusting the kind and content of the oxygen-containing heterocyclic ring containing monomer. For example, when a tetrahydrofurfuryl group and an oxetane group are used, the pot life may be increased to facilitate a working process.

The oxygen-containing heterocyclic ring containing monomer may be present in an amount of about 0.1 wt % to about 10 wt % based on the total weight of the monomer mixture. Within this range, the pressure-sensitive adhesive film may have high adhesive strength, reduced aging time at room temperature, and suppress increase in resistance, thereby maintaining satisfactory characteristics when applied to a touchscreen. For example, the oxygen-containing heterocyclic ring containing monomer may be present in an amount of about 1 wt % to about 8 wt %. Specifically, the oxygen-containing heterocyclic ring containing monomer may be present in an amount of about 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, or 10 wt %.

Preparation of Copolymer

The (meth)acrylate copolymer may be prepared by solution polymerization, photopolymerization, bulk polymerization, emulsion polymerization, or radical polymerization, without being limited thereto.

For example, the (meth)acrylate copolymer may be polymerized using any typical initiator capable of initiating polymerization of a copolymer. For examples, the initiator may include at least one of azobisisobutyronitrile, dimethyl 2,2'-azobis(2-methylpropionate), 2,2'-azobis(2,4-dimethylvaleronitrile), and benzoyl peroxide, without being limited thereto.

In addition, the (meth)acrylate copolymer may be prepared by reversible addition fragmentation change transfer (RAFT) polymerization of the monomer mixture mixed with a RAFT agent and a generally used initiator.

The RAFT agent may be, for example, trithiocarbonate, which may include thiocarbonate represented by Formula 1, without being limited thereto:

[Formula 1]

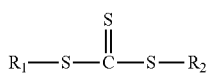

where $R_1$ and $R_2$ may be the same or different and be a substituted or unsubstituted $C_6$ to $C_{20}$ aryl group, a substituted or unsubstituted $C_7$ to $C_{20}$ arylalkyl group, a substituted or unsubstituted $C_1$ to $C_{10}$ alkyl group, a substituted or unsubstituted $C_2$ to $C_{10}$ alkenyl group, a substituted or unsubstituted $C_3$ to $C_{10}$ cycloalkyl group, a substituted or unsubstituted $C_1$ to $C_{10}$ aliphatic heterocyclic group, a substituted or unsubstituted $C_1$ to $C_{10}$ alkoxy group, a substituted or unsubstituted $C_1$ to $C_{10}$ alkylthio group, or a substituted or unsubstituted $C_1$ to $C_{10}$ monoalkyl or dialkyl amino group. Specifically, $R_1$ and $R_2$ may be each independently a $C_7$ to $C_{20}$ arylalkyl group, more specifically a benzyl group.

In one embodiment, the RAFT agent may be dibenzyl trithiocarbonate and be synthesized by a typical synthesis method or commercially available.

The RAFT agent may be present in an amount of about 0.001 parts by weight to about 2 parts by weight based on 100 parts by weight of the alkyl (meth)acrylate monomer. For example, the RAFT agent may be present in an amount of about 0.01 parts by weight to about 2 parts by weight. Specifically, the RAFT agent may be present in an amount of about 0.001, 0.01, 0.05, 0.1, 0.2, 0.3, 0.4, 0.5, 0.6, 0.7, 0.8, 0.9, 1, 1.5, or 2 parts by weight.

The initiator may be any initiator capable of initiating polymerization of (meth)acrylate or vinyl monomers. Examples of available initiators may include azobisisobutyronitrile, dimethyl 2,2'-azobis(2-methylpropionate), 2,2'-azobis(2,4-dimethylvaleronitrile), benzoyl peroxide, dilauroyl peroxide, tertiary-butyl-(2-ethylhexyl) monoperoxycarbonate, tertiary-amyl-(2-ethylhexyl) monoperoxycarbonate, 1,1-di(tertiary-butylperoxy) cyclohexane, 1,1-di(tertiary-amylperoxy) cyclohexane, tertiary-butylperoxy-3,5,5-trimethylhexanoate, 1,1-di(tertiary-butylperoxy)-3,3,5-trimethylcyclohexane, potassium persulfate, sodium persulfate, ammonium persulfate, and water-soluble azo initiators.

The initiator may be present in an amount of about 0.001 parts by weight to about 2 parts by weight based on 100 parts by weight of the alkyl (meth)acrylate monomer. For example, the initiator may be present in an amount of about 0.01 parts by weight to about 2 parts by weight. Specifically, the initiator may be present in an amount of about 0.01, 0.05, 0.1, 0.2, 0.3, 0.4, 0.5, 0.6, 0.7, 0.8, 0.9, 1, 1.5, or 2 parts by weight.

The RAFT polymerization may be performed at about 60° C. to about 100° C. for about 1 hours to about 6 hours after adding the RAFT agent and the generally used initiator to the monomer mixture. The RAFT polymerization may be performed in solventless conditions or in an organic solvent. Examples of available solvents may include anisole, methylethylketone, diethyl ether, dioxane, dimethoxyethane, acetonitrile, and ethyl acetate, without being limited thereto.

Crosslinker

The pressure-sensitive adhesive film of the present invention includes a crosslinker. The crosslinker may be a Lewis base or Lewis acid, and is capable of opening an oxygen-containing O-heterocyclic ring at room temperature, relieving aging conditions of the pressure-sensitive adhesive film and reducing the aging time thereof.

In one embodiment, the crosslinker may include at least one of a polyfunctional amine curing agent, polyfunctional primary, secondary or tertiary amine curing agents, imidazole, isocyanate, and carbodiimide.

The crosslinker may be present in an amount of about 0.01 parts by weight to about 15 parts by weight based on 100 parts by weight of the (meth)acrylate copolymer. Within this range, the pressure-sensitive adhesive film may have reduced aging time at room temperature and high adhesive strength. For example, the crosslinker may be present in an amount of about 0.1 parts by weight to about 10 parts by weight. Specifically, the crosslinker may be present in an amount of about 0.01, 0.05, 0.1, 0.5, 1, 2, 3, 4, 5, 6, 7, 8, 9, 10, 11, 12, 13, 14, or 15 parts by weight.

The pressure-sensitive adhesive film may include, along with the crosslinker, boron trifluoride ($BF_3$) or complexes thereof, p-toluenesulfonic acid, diethyl sulfate, triphenylphosphine, and triphenylamine as a catalyst. The catalyst may be present in an amount of about 0.1 parts by weight to about 10 parts by weight based on 100 parts by weight of the (meth)acrylate copolymer.

Silane Coupling Agent

In another embodiment, the pressure-sensitive adhesive composition may further include a silane coupling agent.

A typical silane coupling agents known in the art may be used. For example, the silane coupling agent may include at least one selected from the group consisting of silicon compounds having an epoxy structure, such as 3-glycidoxypropyltrimethoxysilane, 3-glycidoxypropylmethyldimethoxysilane and 2-(3,4-epoxycyclohexyl)ethyltrimethoxysilane; polymerizable unsaturated group containing silicon compounds, such as vinyltrimethoxysilane, vinyltriethoxysilane and (meth)acryloxypropylmethoxysilane; amino group containing silicon compounds, such as 3-aminopropyltrimethoxysilane, N-(2-aminoethyl)-3-aminopropyltrimethoxysilane and N-(2-aminoethyl)-3-aminopropylmethyldimethoxysilane; and 3-chloropropyltrimethoxysilane, without being limited thereto.

The silane coupling agent may be present in an amount of about 0.01 parts by weight to about 5 parts by weight based on 100 parts by weight of the (meth)acrylate copolymer. Within this range, the pressure-sensitive adhesive film may have excellent adhesive strength to an LCD panel and the (meth)acrylate copolymer may exhibit excellent storage stability. For example, the silane coupling agent may be present in an amount of about 0.01 parts by weight to about 0.5 parts by weight. Specifically, the silane coupling agent may be present in an amount of about 0.01. 0.05, 0.1, 0.2, 0.3, 0.4, 0.5, 1, 1.5, 2, 2.5, 3, 3.5, 4, 4.5, or 5 parts by weight.

Solvent

In another embodiment, the pressure-sensitive adhesive composition may further include a solvent. The solvent may include any solvent capable of dissolving the (meth)acrylate copolymer and the crosslinker, without being particularly limited thereto. For example, the solvent may include methylethylketone, ethyl acetate, or a mixture, without being limited thereto.

Additives

Optionally, the pressure-sensitive adhesive composition may further include typical additives, such as curing accelerators, ionic liquids, lithium salts, inorganic fillers, softeners, antioxidants, anti-aging agents, stabilizers, tackifier resins, modifying resins (polyol, phenol, acrylic, polyester, polyolefin, epoxy, and epoxidized polybutadiene resins), leveling agents, antifoaming agents, plasticizers, dyes, pigments (coloring and extender pigments), treatment agents, UV blocking agents, fluorescence brightening agents, dispersants, heat stabilizers, light stabilizers, UV absorbents, antistatic agents, and lubricants.

The pressure-sensitive adhesive film may be manufactured by applying the pressure-sensitive adhesive composition to a release film, wherein the pressure-sensitive adhesive film may be subjected to aging, drying and aging, or drying. In addition, the dried and/or aged pressure-sensitive adhesive film may be further subjected to curing.

In one embodiment, the pressure-sensitive adhesive film may be subjected to aging at room temperature, for example, 23° C., for about 12 hours to about 96 hours, without being limited thereto. Here, the pressure-sensitive adhesive film may achieve practical adhesion performance even by aging at room temperature within about 30 hours, specifically within about 24 hours.

Another aspect of the present invention relates to a display member including the pressure-sensitive adhesive film.

The display member may include an optical film; and the pressure-sensitive adhesive film attached to one or both surfaces of the optical film. The optical film may be a polarizing plate, a color filter, a retardation film, an oval polarizing film, a reflective film, an anti-reflective film, a compensation film, a brightness enhancement film, an alignment film, a light diffusion film, a glass anti-scattering film, a surface protective film, a plastic LCD substrate, or an ITO film. For example, the optical film may be a polarizing plate for LCD substrate, without being limited thereto. The optical film may be easily manufactured by a person skilled in the art using a generally known method.

Hereinafter, the present invention will be described in more detail with reference to examples and comparative examples. These examples are provided for illustration only and are not to be construed in any way as limiting the present invention.

Preparative Examples

Preparation of (Meth)Acrylate Copolymer

In a 1 L four-neck flask, 100 parts by weight of a monomer mixture according to compositions (unit: mol %) as listed in Tables 1 and 2, 1.5 parts by weight of dibenzyl trithiocarbonate, and 50 parts by weight of methylethylketone (MEK) as a solvent were placed, followed by heating to 65° C. and then maintaining at 65° C. 0.06 parts by weight of dimethyl 2,2'-azobis(2-methylpropionate) (V601, Wako Chemical) as an initiator was diluted at 50% with MEK and added to the reactor. The resulting mixture was reacted at 65° C. for 4 hours and then at 70° C. for two hours, thereby producing a (meth)acrylate copolymer. The entire process was carried out while introducing nitrogen at 10 cc/min.

Monomers:
(A): Alkyl (meth)acrylate monomer
BA: N-butyl acrylate
(B): Monomer having a glass transition temperature (Tg) of 50° C. or higher
ACMO: Acryloylmorpholine
NVP: N-vinylpyrrolidone
IBXA: Isobornyl acrylate
(C): Oxygen-containing heterocyclic ring containing monomer
GMA: Glycidyl methacrylate
OXMA: Oxetane methacrylate
THFA: Tetrahydrofurfuryl acrylate

TABLE 1

| Unit: | (A) | (B) | | | (C) | | | Weight average molecular weight | Glass transition temperature |
|---|---|---|---|---|---|---|---|---|---|
| mol % | BA | ACMO | NVP | IBXA | GMA | OXMA | THFA | (kg/mol) | (° C.) |
| Preparative Example 1 | 85 | 10 | — | — | 5 | — | — | 965.0 | −30.91 |
| Preparative Example 2 | 80 | 15 | — | — | 5 | — | — | 902.5 | −26.55 |
| Preparative Example 3 | 75 | 20 | — | — | 5 | — | — | 891.4 | −19.64 |
| Preparative Example 4 | 83 | 15 | — | — | 2 | — | — | 802.9 | −28.67 |
| Preparative Example 5 | 78 | 15 | — | — | 7 | — | — | 819.4 | −24.84 |
| Preparative Example 6 | 75 | 15 | — | — | 10 | — | — | 874.7 | −22.51 |
| Preparative Example 7 | 80 | 15 | — | — | — | 5 | — | 861.0 | −27.97 |
| Preparative Example 8 | 80 | 15 | — | — | — | — | 5 | 836.6 | −29.21 |
| Preparative Example 9 | 80 | 15 | — | — | — | 5 | — | 526.2 | −28.02 |
| Preparative Example 10 | 80 | 15 | — | — | — | 5 | — | 250.5 | −28.15 |

TABLE 1-continued

| Unit: mol % | (A) BA | (B) ACMO | (B) NVP | (C) IBXA | (C) GMA | (C) OXMA | (C) THFA | Weight average molecular weight (kg/mol) | Glass transition temperature (° C.) |
|---|---|---|---|---|---|---|---|---|---|
| Preparative Example 11 | 80 | — | 15 | — | — | 5 | — | 264.3 | −25.01 |
| Preparative Example 12 | 80 | — | — | 15 | — | 5 | — | 237.2 | −29.15 |
| Preparative Example 13 | 81 | 7 | 7 | — | — | 5 | — | 896.1 | −28.88 |
| Preparative Example 14 | 81 | 7 | — | 7 | — | 5 | — | 904.5 | −29.16 |
| Preparative Example 15 | 81 | — | 7 | 7 | — | 5 | — | 864.5 | −28.66 |
| Preparative Example 16 | 80 | 5 | 5 | 5 | — | 5 | — | 842.1 | −27.62 |
| Preparative Example 17 | 80 | 15 | — | — | 2.5 | 2.5 | — | 867.5 | −29.08 |
| Preparative Example 18 | 80 | 15 | — | — | 2.5 | — | 2.5 | 849.5 | −30.03 |
| Preparative Example 19 | 80 | 15 | — | — | — | 2.5 | 2.5 | 802.7 | −29.10 |
| Preparative Example 20 | 79 | 15 | — | — | 2 | 2 | 2 | 830.5 | −28.85 |

TABLE 2

| Unit: mol % | (A) BA | (B) ACMO | (B) NVP | (C) IBXA | (C) GMA | (C) OXMA | (C) THFA | Weight average molecular weight (kg/mol) | Glass transition temperature (° C.) |
|---|---|---|---|---|---|---|---|---|---|
| Preparative Example 21 | 80 | 20 | — | — | — | — | — | 876.2 | −25.95 |
| Preparative Example 22 | 85 | 15 | — | — | — | — | — | 831.4 | −32.16 |
| Preparative Example 23 | 85 | — | 15 | — | — | — | — | 836.5 | −31.11 |
| Preparative Example 24 | 85 | — | — | 15 | — | — | — | 849.5 | −31.69 |
| Preparative Example 25 | 93 | — | — | — | 7 | — | — | 901.4 | −46.40 |
| Preparative Example 26 | 95 | — | — | — | 5 | — | — | 903.1 | −49.00 |
| Preparative Example 27 | 92 | — | — | — | — | 8 | — | 896.8 | −43.41 |
| Preparative Example 28 | 93 | — | — | — | — | — | 7 | 897.4 | −46.45 |
| Preparative Example 29 | 85 | 7 | 8 | — | — | — | — | 856.5 | −31.60 |
| Preparative Example 30 | 91 | — | — | — | 4 | 5 | — | 855.8 | −44.01 |

100 parts by weight of each of the (meth)acrylate copolymers in the preparative examples was mixed with a crosslinker according to compositions (unit: parts by weight) listed in Tables 3 and 4, followed by stirring at 25° C. for 30 minutes, thereby preparing a pressure-sensitive adhesive composition according to the examples and comparative examples.

Crosslinkers:

Crosslinker 1: Benzyldimethylamine (KH-30, manufactured by Kukdo Chemical Co., Ltd.)

Crosslinker 2: Boron trifluoride diethyl ether complex (($BF_3OEt_2$), 175501-5ML, manufactured by Sigma Aldrich Corporation)

TABLE 3

| | (Meth)acylate copolymer | Crosslinker 1 | Crosslinker 2 |
|---|---|---|---|
| Example 1 | Preparative Example 1 | 10 | — |
| Example 2 | Preparative Example 2 | 10 | — |
| Example 3 | Preparative Example 3 | 10 | — |
| Example 4 | Preparative Example 4 | 10 | — |
| Example 5 | Preparative Example 5 | 10 | — |
| Example 6 | Preparative Example 6 | 10 | — |
| Example 7 | Preparative Example 10 | 10 | — |
| Example 8 | Preparative Example 2 | — | 1 |
| Example 9 | Preparative Example 7 | — | 1 |
| Example 10 | Preparative Example 8 | — | 1 |
| Example 11 | Preparative Example 9 | — | 1 |

TABLE 3-continued

|  | (Meth)acylate copolymer | Crosslinker 1 | Crosslinker 2 |
|---|---|---|---|
| Example 12 | Preparative Example 10 | — | 1 |
| Example 13 | Preparative Example 11 | — | 1 |
| Example 14 | Preparative Example 12 | — | 1 |
| Example 15 | Preparative Example 13 | — | 1 |
| Example 16 | Preparative Example 14 | — | 1 |
| Example 17 | Preparative Example 15 | — | 1 |
| Example 18 | Preparative Example 16 | — | 1 |
| Example 19 | Preparative Example 17 | — | 1 |
| Example 20 | Preparative Example 18 | — | 1 |

TABLE 4

|  | (Meth)acylate copolymer | Crosslinker 1 | Crosslinker 2 |
|---|---|---|---|
| Example 21 | Preparative Example 19 | — | 1 |
| Example 22 | Preparative Example 20 | — | 1 |
| Comparative Example 1 | Preparative Example 21 | — | 1 |
| Comparative Example 2 | Preparative Example 22 | — | 1 |
| Comparative Example 3 | Preparative Example 23 | — | 1 |
| Comparative Example 4 | Preparative Example 24 | — | 1 |
| Comparative Example 5 | Preparative Example 25 | — | 1 |
| Comparative Example 6 | Preparative Example 26 | — | 1 |
| Comparative Example 7 | Preparative Example 27 | — | 1 |
| Comparative Example 8 | Preparative Example 28 | — | 1 |
| Comparative Example 9 | Preparative Example 29 | — | 1 |
| Comparative Example 10 | Preparative Example 30 | — | 1 |

Evaluation of Practical Adhesion Performance

The compositions according to the examples and comparative examples were evaluated as to practical adhesion performance as follows. Results are shown in Tables 5 and 6.

(1) Storage modulus (Pa): Each of the pressure-sensitive adhesive compositions prepared in the examples and comparative examples was applied to a release film (for example, polyethylene terephthalate film) and dried at 85° C. for 4 minutes, followed by aging at 23° C. and 55% RH for 24 hours, thereby producing a pressure-sensitive adhesive film having a 20 μm thick pressure-sensitive adhesive layer. 25 pressure-sensitive adhesive layers obtained by removing the release film from the pressure-sensitive adhesive film were stacked to a thickness of 500 μm and cut into a circular specimen having a diameter of 8 mm. Then, storage modulus (unit: Pa) of the specimen at 25° C. was measured at an oscillation frequency of 0.1 rad/s using a storage modulus tester (Physica MCR-501) by temperature sweep testing while elevating temperature from 0° C. to 120° C. at 10° C./min. The storage modulus was measured after aging for 24 hours and after aging for 7 days to calculate storage modulus variation.

Storage modulus variation (%): Storage modulus variation was calculated by Equation 1 using the storage modulus G1 after aging for 24 hours and the storage modulus G7 after aging for 7 days, and results are shown in Tables 5 and 6:

Storage modulus variation (%)=(G7−G1)/G1×100.  [Equation 1]

(2) Gel fraction (%): Each composition was applied to a release film to a thickness of 25 μm after drying, and a gel fraction was measured by Equation 3 after aging for 1 day and after aging for 7 days and a gel fraction difference was measured by Equation 2. Specifically, each of the pressure-sensitive adhesive compositions was applied to a release film to prepare a pressure-sensitive adhesive, which was dried at 85° C. for 4 minutes and aged at 23° C. and 55% RH for 1 day and for 7 days. 0.5 g of the aged adhesive was covered with a wire mesh, the weight WA of which was measured in advance, so as not to allow leakage of the adhesive. Then, the adhesive covered with the wire mesh was placed in a sample bottle and the weight WB of the adhesive covered with the wire mesh was measured. Next, 50 cc of ethyl acetate was added to the sample bottle, left at 25° C. for 1 day and dried at 100° C. for 12 hours, followed by measuring the weight WC of the wire mesh containing the pressure-sensitive adhesive film. The gel fraction of the pressure-sensitive adhesive film was calculated by Equation 3. Results are shown in Tables 5 and 6. A gel fraction difference of 5% or lower between the gel fraction after aging for 1 day and the gel fraction after aging for 7 days means that aging was completed. A polyethylene terephthalate film (thickness: 38 μm) was used as the release film, a 100 ml wide mouth bottle was used as the sample bottle, and a 200 mesh wire mesh was used as the wire mesh.

Gel fraction difference=GF7−GF1  [Equation 2]

In Equation 2, GF7 is a gel fraction after aging for 7 days as calculated by Equation 3 and GF1 is a gel fraction after aging for 1 day as calculated by Equation 3.

Gel fraction (%)=(WC−WA)/(WB−WA)×100  [Equation 3]

TABLE 5

|  | Storage modulus | | | Gel fraction | | |
|---|---|---|---|---|---|---|
|  | 24-hour aging (G1, Pa) | 7-day aging (G7, Pa) | Storage modulus variation (%) | 1-day aging (GF1, %) | 7-day aging (GF7, %) | Gel fraction difference (7-day aging−1-day aging) |
| Example 1 | 110,000 | 115,000 | 4.545455 | 87.7 | 89.1 | 1.596351 |
| Example 2 | 115,000 | 122,000 | 6.086957 | 88.5 | 89.1 | 0.677966 |
| Example 3 | 125,000 | 131,000 | 4.8 | 87.1 | 88.0 | 1.033295 |
| Example 4 | 118,000 | 124,000 | 5.084746 | 69.5 | 75.1 | 8.057554 |
| Example 5 | 120,000 | 122,000 | 1.666667 | 89.4 | 90.4 | 1.118568 |
| Example 6 | 121,000 | 126,000 | 4.132231 | 91.1 | 91.5 | 0.439078 |
| Example 7 | 116,000 | 124,000 | 6.896552 | 84.5 | 86.2 | 2.011834 |
| Example 8 | 120,000 | 127,000 | 5.833333 | 88.5 | 89.8 | 1.468927 |
| Example 9 | 119,000 | 125,000 | 5.042017 | 87.5 | 88.4 | 1.028571 |
| Example 10 | 117,000 | 126,000 | 7.692308 | 57.1 | 58.4 | 2.276708 |
| Example 11 | 117,000 | 124,000 | 5.982906 | 85.4 | 87.1 | 1.990632 |
| Example 12 | 120,000 | 122,000 | 1.666667 | 81.2 | 86.2 | 6.157635 |
| Example 13 | 127,000 | 128,000 | 0.787402 | 89.5 | 89.9 | 0.446927 |
| Example 14 | 116,000 | 118,000 | 1.724138 | 84.5 | 85.4 | 1.065089 |

TABLE 5-continued

|  | Storage modulus | | | Gel fraction | | |
|---|---|---|---|---|---|---|
|  | 24-hour aging (G1, Pa) | 7-day aging (G7, Pa) | Storage modulus variation (%) | 1-day aging (GF1, %) | 7-day aging (GF7, %) | Gel fraction difference (7-day aging-1-day aging) |
| Example 15 | 110,000 | 112,000 | 1.818182 | 86.3 | 87.8 | 1.738123 |
| Example 16 | 109,000 | 115,000 | 5.504587 | 82.5 | 86.5 | 4.848485 |
| Example 17 | 112,000 | 114,000 | 1.785714 | 88.4 | 89.6 | 1.357466 |
| Example 18 | 110,000 | 115,000 | 4.545455 | 87.4 | 88.4 | 1.144165 |
| Example 19 | 109,000 | 115,000 | 5.504587 | 91.6 | 92.8 | 1.310044 |
| Example 20 | 108,000 | 117,000 | 8.333333 | 75.6 | 81.5 | 7.804233 |

TABLE 6

|  | Storage modulus | | | Gel fraction | | |
|---|---|---|---|---|---|---|
|  | 24-hour aging (G1, Pa) | 7-day aging (G7, Pa) | Storage modulus variation (%) | 1-day aging (%) | 7-day aging (%) | Gel fraction difference (7-day aging-1-day aging) |
| Example 21 | 109,000 | 117,000 | 7.33945 | 67.1 | 72.6 | 8.196721 |
| Example 22 | 111,000 | 115,000 | 3.603604 | 79.8 | 82.77 | 3.721805 |
| Comparative Example 1 | 120,000 | 124,000 | 3.333333 | 0 | 0 | 0 |
| Comparative Example 2 | 123,000 | 129,000 | 4.878049 | 0 | 0 | 0 |
| Comparative Example 3 | 130,000 | 131,000 | 0.769231 | 0 | 0 | 0 |
| Comparative Example 4 | 121,000 | 123,000 | 1.652893 | 0 | 0 | 0 |
| Comparative Example 5 | 89,000 | 95,000 | 6.741573 | 36.4 | 39.0 | 7.142857 |
| Comparative Example 6 | 85,000 | 86,000 | 1.176471 | 34.1 | 35.2 | 3.225806 |
| Comparative Example 7 | 88,000 | 96,000 | 9.090909 | 28.4 | 31.1 | 9.507042 |
| Comparative Example 8 | 83,000 | 89,000 | 7.228916 | 5.0 | 5.4 | 8.0 |
| Comparative Example 9 | 116,000 | 120,000 | 3.448276 | 0 | 0 | 0 |
| Comparative Example 10 | 118,000 | 125,000 | 5.932203 | 46.2 | 46.6 | 0.865801 |

The results show that the pressure-sensitive adhesive compositions according to the present invention had a storage modulus variation of 20% or less between 24-hour aging and 7-day aging and a gel fraction variation of 10% or less between 24-hour aging and 7-day aging and thus achieved practical adhesion performance by aging within 24 hours at room temperature. On the contrary, the pressure-sensitive adhesive compositions of the comparative examples had a substantial storage modulus variation and a substantial gel fraction variation between 24-hour aging and 7-day aging and thus did not achieve practical adhesion performance by 24-hour aging at room temperature and required higher aging temperature and/or additional aging time.

Property Evaluation

Physical properties of the pressure-sensitive adhesive compositions prepared in the examples and comparative examples were evaluated by the following methods, and results are shown in Tables 7 and 8.

(1) Creep: Each pressure-sensitive adhesive composition was applied to a polarizing plate such that a pressure-sensitive adhesive layer had a final thickness of 25 μm, followed by drying at 90° C. for 4 minutes and aging at 23° C. and 55% RH for 24 hours to prepare a sample. The polarizing plate coated with the pressure-sensitive adhesive layer was cut to have a contact area of 1.5 cm×1.5 cm (width×length), stacked onto a glass substrate, and stuck thereto at 50° C. and 3.5 atm. The resulting polarizing plate was left at 23° C. for 3 days to prepare a specimen. By applying a force of 2,250 kgf to the specimen for 1,000 seconds using a universal testing machine (UTM), a moving distance (μm) of the adhesive layer was measured to evaluate creep of the adhesive composition. "Slip" in Table 8 means that cohesion of the pressure-sensitive adhesive layer was destroyed to allow the polarizing plate to be separated from the glass substrate.

(2) Peel strength (gf/25 mm): 180° peel strength between a pressure-sensitive adhesive and a glass substrate was measured in accordance with Japanese Industrial Standard (JIS) 2107. Each of the pressure-sensitive adhesive compositions for polarizing plates prepared in the examples and comparative examples was applied to a polarizing plate such that a pressure-sensitive adhesive layer had a thickness of 20 μm, followed by drying at 90° C. for 4 minutes and aging at 23° C. and 55% RH for 24 hours to prepare a sample. Here, the polarizing plate included a polarizer and triacetyl cellulose (TAC) protective films deposited on both surfaces of the polarizer. The sample was cut into 25 mm×210 mm×280 μm (width×length×thickness) specimens, and the polarizing plate was stacked onto an alkali-free glass substrate (25 mm×140 mm in width×length) such that the adhesive film could be stacked on the glass substrate in an area of 25 mm×140 mm (width×length), and was stuck thereto at 50° C. and 3.5 atm. Subsequently, the resulting polarizing plate was left at 25° C. for 1 hour to prepare a specimen for measuring peel strength. With the pressure-sensitive adhesive layer and the glass substrate were coupled to upper and lower jigs in a 30-kgf load cell, peeling was performed at 180°, 25° C. and a tensile speed of 300 mm/min, and load upon peeling was measured using a texture analyzer (TA-XT Plus, Stable Micro Systems).

(3) Reworkability: A polarizing plate manufactured in the same manner as those for peel strength test (2) was cut into a 200 mm×250 mm (width×length) specimen, which was attached to a cell for an LCD device, left in a 50° C. drying oven for 4 hours, and left at room temperature for 30 days. Evaluation results are as follows.

○: Polarizing plate peelable and pressure-sensitive adhesive not transferred to LCD cell Δ: Polarizing plate peelable but pressure-sensitive adhesive transferred to LCD cell x: Polarizing plate unpeelable (4) Pot life: The pressure-sensitive adhesive compositions for polarizing plates prepared in the examples and comparative examples was adjusted at 25° C. and evaluated as to viscosity by a B-type viscometer. Viscosity of each of the pressure-sensitive adhesive compositions was measured immediately after preparation and after 12 hours. Variation between the viscosity immediately after preparation and the viscosity after 12 hours of 10% or less was evaluated as ⊚, greater than 10% and 30% or less as ○, greater than 30% as Δ, and gelation as x.

(5) Durability: Polarizing plates (100 mm×80) mm manufactured in the same manner as those for peel strength test (2) were attached to both surfaces of a glass substrate and subjected to a pressure of 4 kg/cm² to 5 kg/cm² to prepare a specimen. Heat resistance of the specimens was evaluated by observing bubbling or peeling after being left at 85° C. for 250 hours. Moisture resistance of the specimens was evaluated by observing bubbling or peeling after being left at 60° C. and 95% RH for 250 hours. Evaluation results are as follows.

⊚: Neither bubbling nor peeling
○: Fine bubbling and peeling not observable with the naked eye
Δ: Slight bubbling and peeling
x: Bubbling and peeling observed (6) Light leakage: Each of the pressure-sensitive adhesive compositions for polarizing plates prepared in the examples and comparative examples was applied to a polarizing plate such that a pressure-sensitive adhesive layer had a thickness of 20 μm, dried at 90° C. for 4 minutes, followed by aging at 23° C. and 55% RH for 24 hours to prepare a sample. Here, the polarizing plate included a polarizer and triacetyl cellulose (TAC) protective films deposited on both surfaces of the polarizer. The sample was cut into 50 mm×40 mm (2.5 inches) specimens and 125 mm×100 mm (7 inches) specimens, which were stacked onto a glass substrate. The specimens for light leakage evaluation were stacked on both surfaces of the glass substrate such that optical axes of the polarizing plates were perpendicular to each other. The specimens were maintained at 323 K for 1,000 seconds in an autoclave under vacuum in order to obtain good adhesion. The specimens were left at 80° C. for 250 hours or under moist-heat resistance conditions at 60° C. and 90% RH for 250 hours, and then left at 25° C. for 1 hour or longer before use thereof. After operating an LCD using the sample, brightness at the front side of the display panel was measured at a height of 1 m using a brightness tester (RISA, Hiland Co., Ltd.). Brightness c at the central region of the panel and brightness a, b, d and e at edges of the panel at which light leakage occurred were measured. As shown in FIG. 1, brightness measuring points were placed at four midpoints of each side of the panel, respectively. Here, each side of the panel adjoined the circumference of a circle for brightness measurement having a radius of 0.5 cm. In FIG. 1, a, b, c, d and e indicate brightness measuring points. The degree of light leakage (ΔL) was quantified according to the following Equation 3. A lower ΔL value indicates better light leakage characteristics, which are evaluated according to the following criteria.

$$L=[(a+b+d+e)/4]/c-1 \quad \text{[Equation 3]}$$

where a, b, d and e represent brightness values measured at brightness measurement points a, b, d and e in FIG. 1, respectively, and c is a brightness value at the central region c before reliability testing.

⊚: ΔL is 0 or greater and 0.1 or less
○: ΔL is greater than 0.1 and less than 0.3
Δ: ΔL is greater than 0.3 and 0.5 or less
x: ΔL is greater than 0.5

TABLE 7

|  | Creep (μm) | Peel strength gf/ 25 mm | Re-work-ability | Pot life | Heat resis-tance | Moisture resis-tance | Light leak-age |
|---|---|---|---|---|---|---|---|
| Example 1 | 250 | 353 | ○ | ⊚ | ⊚ | ⊚ | ⊚ |
| Example 2 | 240 | 345 | ○ | ⊚ | ⊚ | ⊚ | ⊚ |
| Example 3 | 220 | 306 | ○ | ⊚ | ⊚ | ⊚ | ⊚ |
| Example 4 | 255 | 368 | ○ | ⊚ | ⊚ | ⊚ | ⊚ |
| Example 5 | 250 | 250 | ○ | ⊚ | ⊚ | ⊚ | ⊚ |
| Example 6 | 180 | 346 | ○ | ⊚ | ⊚ | ⊚ | ⊚ |
| Example 7 | 280 | 352 | ○ | ⊚ | ⊚ | ⊚ | ⊚ |
| Example 8 | 240 | 345 | ○ | ⊚ | ⊚ | ⊚ | ⊚ |
| Example 9 | 255 | 368 | ○ | ⊚ | ⊚ | ⊚ | ⊚ |
| Example 10 | 270 | 370 | ○ | ⊚ | ⊚ | ⊚ | ⊚ |
| Example 11 | 294 | 336 | ○ | ⊚ | ⊚ | ⊚ | ⊚ |
| Example 12 | 280 | 352 | ○ | ⊚ | ⊚ | ⊚ | ⊚ |
| Example 13 | 285 | 298 | ○ | ⊚ | ⊚ | ⊚ | ⊚ |
| Example 14 | 290 | 259 | ○ | ⊚ | ⊚ | ⊚ | ⊚ |
| Example 15 | 284 | 351 | ○ | ⊚ | ⊚ | ⊚ | ⊚ |
| Example 16 | 290 | 346 | ○ | ⊚ | ⊚ | ⊚ | ⊚ |
| Example 17 | 275 | 230 | ○ | ⊚ | ⊚ | ⊚ | ⊚ |
| Example 18 | 270 | 294 | ○ | ⊚ | ⊚ | ⊚ | ⊚ |

TABLE 7-continued

|  | Creep (μm) | Peel strength gf/ 25 mm | Re- work- ability | Pot life | Heat resis- tance | Mois- ture resis- tance | Light leak- age |
|---|---|---|---|---|---|---|---|
| Example 19 | 284 | 310 | ◯ | ◎ | ◎ | ◎ | ◎ |
| Example 20 | 274 | 340 | ◯ | ◎ | ◎ | ◎ | ◎ |

TABLE 8

|  | Creep (μm) | Peel strength (gf/25 mm) | Re- work- ability | Pot life | Heat resist- ance | Moisture resist- ance | Light leakage |
|---|---|---|---|---|---|---|---|
| Example 21 | 298 | 360 | ◯ | ◎ | ◎ | ◎ | ◎ |
| Example 22 | 286 | 298 | ◯ | ◎ | ◎ | ◎ | ◎ |
| Comparative Example 1 | Slip | 650 | X | ◯ | X | X | ◯ |
| Comparative Example 2 | Slip | 745 | X | ◯ | X | X | ◯ |
| Comparative Example 3 | Slip | 840 | X | ◯ | X | X | ◯ |
| Comparative Example 4 | Slip | 656 | X | ◯ | X | X | ◯ |
| Comparative Example 5 | 320 | 390 | ◯ | X | ◯ | X | X |
| Comparative Example 6 | 345 | 356 | ◯ | ◯ | ◯ | X | X |
| Comparative Example 7 | 360 | 290 | ◯ | X | ◯ | X | X |
| Comparative Example 8 | Slip | 687 | ◯ | X | ◯ | X | X |
| Comparative Example 9 | Slip | 890 | X | ◯ | X | X | ◯ |
| Comparative Example 10 | 450 | 461 | ◯ | X | X | X | X |

The results show that the pressure-sensitive adhesives of Examples 1 to 22 had excellent creep resistance, superior peel strength, excellent reworkability, pot life and durability, and improved light leakage even after 24-hour aging at room temperature, as compared with those in Comparative Examples 1 to 10.

It should be understood that various modifications, changes, alterations, and equivalent embodiments may be made by those skilled in the art without departing from the spirit and scope of the invention.

What is claimed is:

1. A pressure-sensitive adhesive film comprising a (meth) acrylate copolymer and a crosslinker and having a gel fraction of about 50% to about 95% and a storage modulus variation G' of about 20% or less as represented by Equation 1:

$$G' = (G7 - G1)/G1 \times 100 \qquad \text{[Equation 1]}$$

where G1 is the storage modulus of the pressure-sensitive adhesive film at 25° C. after aging at 23° C. and 55% RH for 1 day and G7 is the storage modulus of the pressure-sensitive adhesive film at 25° C. after aging at 23° C. and 55% RH for 7 days.

2. The pressure-sensitive adhesive film according to claim 1, wherein the pressure-sensitive adhesive film has a storage modulus variation G' of about 0.5% to about 10%.

3. The pressure-sensitive adhesive film according to claim 1, wherein the pressure-sensitive adhesive film has storage moduli G1 and G7 at 25° C. of about $10^5$ Pa to about $10^6$ Pa.

4. The pressure-sensitive adhesive film according to claim 1, wherein the pressure-sensitive adhesive film has a gel fraction difference of about 10% or less as calculated by Equation 2:

$$\text{Gel fraction difference} = GF7 - GF1 \qquad \text{[Equation 2]}$$

where GF7 is the gel fraction after aging for 7 days as calculated by Equation 3 and GF1 is the gel fraction after aging for 1 day as calculated by Equation 3:

$$\text{Gel fraction (\%)} = (WC - WA)/(WB - WA) \times 100 \qquad \text{[Equation 3]}$$

where WA is the weight of a wire mesh; WB is the total weight of 0.5 g of a specimen covered with the wire mesh, in which the specimen is obtained by aging the pressure-sensitive adhesive film at 23° C. and 55% RH for 1 day or 7 days; and WC is the total weight of the pressure-sensitive adhesive film and the wire mesh obtained by placing a specimen, obtained by aging the pressure-sensitive adhesive film and covered with the wire mesh, in a sample bottle and adding 50 cc of ethyl acetate to the sample bottle, followed by storage at 25° C. for 1 day and drying at 100° C. for 12 hours.

5. The pressure-sensitive adhesive film according to claim 1, wherein the pressure-sensitive adhesive film has an acid value of about 0.

6. The pressure-sensitive adhesive film according to claim 1, wherein the (meth)acrylate copolymer has a weight average molecular weight of about 100,000 g/mol to about 1,500,000 g/mol.

7. The pressure-sensitive adhesive film according to claim 1, wherein the (meth)acrylate copolymer has a polydispersity index (PDI) of about 2.5 to about 6.0.

8. The pressure-sensitive adhesive film according to claim 1, wherein the (meth)acrylate copolymer has a glass transition temperature (Tg) of about −40° C. to about −10° C.

9. The pressure-sensitive adhesive film according to claim 1, wherein the (meth)acrylate copolymer is a copolymer of a monomer mixture comprising an alkyl (meth)acrylate monomer, a monomer having a glass transition temperature (Tg) of about 50° C. or higher, and an oxygen-containing heterocyclic ring containing monomer.

10. The pressure-sensitive adhesive film according to claim 9, wherein the (meth)acrylate copolymer comprises about 60 wt % to about 94.9 wt % of the alkyl (meth)acrylate monomer, about 5 wt % to about 30 wt % of the monomer having a glass transition temperature (Tg) of about 50° C. or higher, and about 0.1 wt % to about 10 wt % of the oxygen-containing heterocyclic ring containing monomer.

11. A display member comprising the pressure-sensitive adhesive film of claim 1.

12. A pressure-sensitive adhesive film comprising:
a (meth)acrylate copolymer, the (meth)acrylate copolymer comprising a copolymer of a monomer mixture comprising an alkyl (meth)acrylate monomer, a monomer having a glass transition temperature (Tg) of about 50° C. or higher and an oxygen-containing heterocyclic ring containing monomer; and a crosslinker, wherein the pressure-sensitive adhesive film has a storage modulus variation G' of about 20% or less as represented by Equation 1:

$$G'=(G7-G1)/G1\times100 \qquad \text{[Equation 1]}$$

where G1 is the storage modulus of the pressure-sensitive adhesive film at 25° C. after aging at 23° C. and 55% RH for 1 day and G7 is the storage modulus of the pressure-sensitive adhesive film at 25° C. after aging at 23° C. and 55% RH for 7 days.

13. The pressure-sensitive adhesive film according to claim 12, wherein the alkyl (meth)acrylate monomer comprises (meth)acrylate esters having a $C_1$ to $C_{20}$ linear or branched alkyl group.

14. The pressure-sensitive adhesive film according to claim 12, wherein the monomer having a glass transition temperature (Tg) of about 50° C. or higher comprises at least one of N-vinylpyrrolidone, acrylamide, N-alkyl substituted acrylamide, acryloylmorpholine, isobornyl acrylate, and cyclohexyl methacrylate.

15. The pressure-sensitive adhesive film according to claim 12, wherein the oxygen-containing heterocyclic ring containing monomer comprises at least one oxygen-containing heterocyclic ring of an epoxy group, an oxetane group, and a tetrahydrofurfuryl group.

16. The pressure-sensitive adhesive film according to claim 12, wherein the oxygen-containing heterocyclic ring containing monomer comprises at least one of glycidyl methacrylate, oxetane methacrylate, and tetrahydrofurfuryl acrylate.

17. The pressure-sensitive adhesive film according to claim 12, wherein the pressure-sensitive adhesive film further comprises a silane coupling agent.

18. The pressure-sensitive adhesive film according to claim 12, wherein the pressure-sensitive adhesive film has storage moduli G1 and G7 at 25° C. of about $10^5$ Pa to about $10^6$ Pa.

19. A pressure-sensitive adhesive film comprising:
a (meth)acrylate copolymer, the (meth)acrylate copolymer comprising a copolymer of a monomer mixture comprising an alkyl (meth)acrylate monomer, a monomer having a glass transition temperature (Tg) of about 50° C. or higher and an oxygen-containing heterocyclic ring containing monomer; and a crosslinker, wherein the pressure-sensitive adhesive film has a gel fraction difference of about 10% or less as calculated by Equation 2:

$$\text{Gel fraction difference}=GF7-GF1 \qquad \text{[Equation 2]}$$

where GF7 is the gel fraction after aging for 7 days as calculated by Equation 3 and GF1 is the gel fraction after aging for 1 day as calculated by Equation 3:

$$\text{Gel fraction (\%)}=(WC-WA)/(WB-WA)\times100 \qquad \text{[Equation 3]}$$

where WA is the weight of a wire mesh; WB is the total weight of 0.5 g of a specimen covered with the wire mesh, in which the specimen is obtained by aging the pressure-sensitive adhesive film at 23° C. and 55% RH for 1 day or 7 days; and WC is the total weight of the pressure-sensitive adhesive film and the wire mesh obtained by placing the specimen, which is obtained by aging the pressure-sensitive adhesive film and covered with the wire mesh, in a sample bottle and adding 50 cc of ethyl acetate to the sample bottle, followed by storage at 25° C. for 1 day and drying at 100° C. for 12 hours.

* * * * *